(12) United States Patent
Adelman et al.

(10) Patent No.: US 7,049,390 B2
(45) Date of Patent: May 23, 2006

(54) POLY(1,3-PROPYLENE-CO-1,4:3,6-DIANHYDRO-D-SORBITOL TEREPHTHALATE) AND MANUFACTURING PROCESS

(75) Inventors: Douglas J. Adelman, Wilmington, DE (US); Robin N. Greene, Lewes, DE (US); Donald E. Putzig, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 246 days.

(21) Appl. No.: 10/172,112

(22) Filed: Jun. 14, 2002

(65) Prior Publication Data

US 2003/0232960 A1    Dec. 18, 2003

(51) Int. Cl.
*C08G 63/68*    (2006.01)
*C08G 63/78*    (2006.01)

(52) U.S. Cl. ............... 528/300; 528/275; 528/277; 528/279; 528/280; 528/281; 528/283; 528/285; 528/308.6; 524/777; 524/780; 524/783; 524/785

(58) Field of Classification Search ........... 528/275, 528/277, 279, 280, 281, 283, 285, 308.6, 528/300; 524/777, 780, 783, 785
See application file for complete search history.

(56) References Cited

U.S. PATENT DOCUMENTS

| | | | |
|---|---|---|---|
| 5,912,307 A | 6/1999 | Paschke et al. | |
| 5,958,581 A | 9/1999 | Khanarian et al. | |
| 5,959,066 A | 9/1999 | Charbonneau et al. | |
| 6,063,464 A | 5/2000 | Charbonneau et al. | |
| 6,063,465 A | 5/2000 | Charbonneau et al. | |
| 6,063,495 A | 5/2000 | Charbonneau et al. | |
| 6,166,170 A | 12/2000 | Putzig | |

OTHER PUBLICATIONS

DuPont Tyzor Organic Titanates, General Brochure (2001).
DuPont Tyzor Organic Titanates, Technical Note—Grade Chart (2001).
DuPont Tyzor Organic Titanates, Technical Note—Grade Selection Chart (2001).

*Primary Examiner*—Samuel A. Acquah
(74) *Attorney, Agent, or Firm*—Mark D. Kuller; Gail A. Dalickas

(57) ABSTRACT

A melt polymerization process for the preparation of poly (1,3-propylene-co-isosorbide) terephthalate (3GIT), new 3GITs and products made from the 3GITs. The process comprises (a) providing a mixture comprising terephthalic acid or its alkyl ester, 1,3-propanediol and isosorbide in a molar ratio of diols to terephthalic acid or its alkyl ester of from about 1.1:1 to about 1.6:1 and a molar ratio of 1,3-propanediol to isosorbide of from about 2:1 to about 10:1; (b) reacting the mixture in an inert atmosphere at a temperature of about 180 to about 245° C., with concurrent removal of a distillate comprising at least 80% of the water or alkanol volatile reaction product, wherein the distillate contains less than about 5 weight % 1,3-propanediol and less than 1 weight % isosorbide; and (c) continuing the reaction in the presence of a polycondensation catalyst at a pressure of about 0.25 to about 2 mm Hg and about 245 to about 260° C. to form a 3GIT containing about 4 to about 20 mole % isosorbide units, based on the 3GIT.

22 Claims, No Drawings

POLY(1,3-PROPYLENE-CO-1,4:3,6-DIANHYDRO-D-SORBITOL TEREPHTHALATE) AND MANUFACTURING PROCESS

FIELD OF THE INVENTION

The present invention is directed to a new process for manufacturing poly(1,3-propylene-co-1,4:3,6-dianhydro-D-sorbitol terephthalate)s and new poly(1,3-propylene-co-1,4:3,6-dianhydro-D-sorbitol terephthalate)s.

BACKGROUND OF THE INVENTION

The diol 1,4:3,6-dianhydro-D-sorbitol, also referred to herein as isosorbide, has the formula shown by Khanarian et al. in U.S. Pat. No. 5,958,581 at column 1, line 55. Isosorbide is readily made from renewable resources, such as sugars and starches. For example, isosorbide can be made from D-glucose by hydrogenation followed by acid-catalyzed dehydration. Poly(1,3-propylene-co-1,4:3,6-dianhydro-D-sorbitol terephthalate) is referred to as 3GIT and poly(1,3-propylene terephthalate) as 3GT. Di-1,3-propylene glycol is referred to as DPG. 1,3-propylene glycol is also referred to as 1,3-propanediol or "3G". Trademarks are shown in upper case.

The relatively low glass transition temperature (Tg) of 3GT (~45–50° C.) can lead to slight tackiness of the polymer when stored at high temperatures. An instance of this is sometimes evidenced on spools of fiber stored in warehouses in hot weather.

Charbonneau et al., in U.S. Pat. No. 6,063,464, disclose the preparation of copolymers prepared from isosorbide, one or more other diols, and a diacid or diester such as terephthalic acid or its dimethyl ester. The diols include 1,3-propanediol. Claimed uses of such polymers include resins, films, sheets, beverage bottles, fibers, optical articles, etc. An example of the preparation of 3GIT was provided, with the ratio 1,3-propanediol:isosorbide being 22:1 as charged. The measured content of isosorbide in the resulting polymer was 0.3 mole %. In spite of discussing the increased Tg resulting from the inclusion of isosorbide in other poly(alkylene diol-co-isosorbide terephthalate)s, the Tg for this example decreased.

It is desirable to prepare 3GITs with a low level of color and a Tg higher than the 45–50° C. Tg of 3GT, and, most importantly, both a low level of color and a higher Tg. Such improved properties aid in the use of 3GIT in many markets, including beverage bottles, film or sheet, fibers, monofilaments, and optical articles (e.g., compact disc or digital versatile disc). In many of these markets, aesthetics are important, and having a very low color resin is highly desirable.

SUMMARY OF THE INVENTION

The invention is directed to a melt polymerization process for the preparation of poly(1,3-propylene-co-isosorbide) terephthalate (3GIT). The process comprises (a) providing a mixture comprising terephthalic acid or its alkyl ester, 1,3-propanediol and isosorbide in a molar ratio of diols to terephthalic acid or its alkyl ester of from about 1.1:1 to about 1.6:1 and a molar ratio of 1,3-propanediol to isosorbide of from about 2:1 to about 10:1; (b) reacting the mixture in an inert atmosphere at a temperature of about 180 to about 245° C., with concurrent removal of a distillate comprising at least 80% of the water or alkanol volatile reaction product, wherein the distillate contains less than about 5 weight % 1,3-propanediol and less than 1 weight % isosorbide; and (c) continuing the reaction in the presence of a polycondensation catalyst at a pressure of about 0.25 to about 2 mm Hg and about 245 to about 260° C. to form a 3GIT containing about 4 to about 20 mole % isosorbide units, based on the 3GIT.

In one preferred embodiment, the terephthalic acid or its alkyl ester is terephthalic acid and the distillate comprises water. In another preferred embodiment, the terephthalic acid or its alkyl ester is dimethyl terephthalate and the distillate comprises methanol.

Preferably, the mixture further comprises an alkali, alkaline earth or ammonium base. Preferably the base is present in a molar ratio of the base to the terephthalic acid or its alkyl ester is about 1:900 to about 1:14,000.

Preferably, the mixture further comprises the polycondensation catalyst. Preferred polycondensation catalysts are Sb(III) salts; Ti(IV) salts; acetate salts of Co(II), Zn(II) or Sb(II); alkanoate salts of Co(II) or Sb(III); oxides of Sb(II), Sb(III) or Ge(IV); glycol-solubilized oxides of Ge(IV), Sb(II) or Sb(III); ortho titanate esters; solvent-based chelated organic titanates; aqueous based chelated organic titanates; ortho zirconate esters; solvent-based chelated organic zirconates; and aqueous-based chelated organic zirconates; and combination thereof. Preferably, the molar ratio of catalyst to terephthalic acid or its alkyl ester is about 1:1,000 to about 1:7,300. More preferably the polycondensation catalyst is selected from the group consisting of solvent-based chelated organic titanates and aqueous based chelated organic titanates.

Preferably, the Hunter b* color of the 3GIT is lowered to about 2.0 to about −2.0 using coloring agents.

In one preferred embodiment, the process further comprises solid state polymerizing the 3GIT.

The process can be carried out in a batch, continuous or semi-continuous manner. In one preferred embodiment, a batch reaction is carried out in a reactor equipped with a distillation column wherein: (i) the concurrent removal of the at least 80% of the water of reaction comprises separation of 1,3-propanediol and isosorbide from the water or methanol by fractional distillation in the distillation column; (ii) after the step (b) and prior to the step (c), the process further comprises: (A) reducing the reactor pressure at a rate of about 0.5 to about 5 psi/min to between atmospheric pressure and about 80 mm Hg, and (B) subsequently reducing the pressure to the pressure of about 0.25 to about 2 mm Hg as the temperature is raised to about 245 to about 260° C.

The invention is also directed to new poly(1,3-propylene-co-isosorbide) terephthalates (3GITs). Preferably, the 3GIT has a Hunter b* color about 2.0 to about −2.0. Preferably, Hunter L* is at least 70 and Hunter a* is about 2.0 to about −2.0. Preferably, the 3GIT has a $T_g$ greater than 50° C., more preferably at least about 55°, and most preferably at least about 60° C.

The invention is also directed to shaped articles comprising the 3GIT. Preferred examples include beverage bottles, film or sheet, fibers, monofilaments, and optical articles (e.g., compact disc or digital versatile disc). The invention is also directed to polymer blends and alloys made with the 3GIT.

DETAILED DESCRIPTION OF THE INVENTION

The present invention is directed to a new process to make 3GITs and new 3GITs. The 3GIT preferably contains at least about 3 and more preferably at least about 4 mole % of isosorbide units, based on the 3GIT. It preferably contains up, to about 20 mole %, more preferably up to about 15 mole %, even more preferably up to about 12 mole %, and most preferably up to about 10 mole %, isosorbide units, based on the 3GIT.

The 3GITs are prepared from terephthalic acid or its alkyl ester, 1,3-propanediol and isosorbide.

The reaction mixture can contain small amounts of other reactants. Diacids or diesters other than terephthalic acid or its alkyl ester acid can be used in amount up to about 15 mole %, preferably no more than 10 mole %, and most preferably no more than 2 mole %, based on the total 3GIT. Examples include isophthalic acid, 1,4-cyclohexane dicarboxylic acid, 2,6-naphthalene dicarboxylic acid, 1,3-cyclohexane dicarboxylic acid, succinic acid, glutaric acid, adipic acid, sebacic acid, 1,12-dodecane dioic acid, and the derivatives thereof such as the dimethyl, diethyl, or dipropyl esters of these dicarboxylic acids. Small amounts of trifunctional acids may also be employed, e.g., 1,3,5-benzenetricarboxylic acid.

Similarly, up to 15 mole %, preferably no more than 10 mole %, and most preferably no more than 2%, of other 3 to 12 carbon atoms aliphatic diols may be used in place of the 1,3-propanediol. Examples include diols having the empirical formula HO—$(C_nH_{2n})$—OH, where n is an integer from 2–12, for example, ethanediol, 1,4-butanediol, 1,5-pentanediol, 1,6-hexanediol, and 1,10-decanediol. Also included are branched diols such as 2,2-dimethyl-1,3-propanediol; cis or trans-1,4-cyclohexanedimethanol and mixtures of the cis and trans isomers; 2,2,4,4-tetramethyl-1,3-cyclobutanediol; triethylene glycol; 2,2-bis[4-(2-hydroxyethoxy)phenyl]propane; 1,1-bis[4-(2-hydroxyethoxy)phenyl]cyclohexane; 9,9-bis[4-(2-hydroxyethoxy)phenyl]fluorene. Preferred diol moieties are derived from ethylene glycol, butylene glycol, propylene glycol and cyclohexanedimethanol. Small amounts of alcohols with functionality greater than 2 may also be utilized, e.g., trimethylolpropane and pentaerythritol.

In addition, up to 15 molar equivalents %, preferably no more than 10 molar equivalents %, and most preferably no more than 2 molar equivalents %, of, other anhydrosugar alcohols may be used based on isosorbide. Examples of other anhydrosugar alcohols include 1,4:3,6-dianhydromannitol; 1,4:3,6-dianhydroiditol; and 1,4-anhydroerythritol.

A catalyst is required for polycondensation. It may be added at any time.

Polycondensation catalysts that may be used include salts of Li, Ca, Mg, Zr, Mn, Zn, Pb, Sb, Sn, and Ti, such as acetate salts and oxides, including glycol adducts, and Ti alkoxides and chelates. These are generally known in the art, and the person of ordinary skill in the art can readily select the specific catalyst or combination or sequence of catalysts used. The preferred catalyst and preferred conditions are selected based on whether the diacid monomer is polymerized as the free diacid or as an alkyl ester or as a diacid chloride.

The preferred catalysts are Sb(III) salts; Ti(IV) salts; acetate salts of Co(II), Zn(II) or Sb(II); alkanoate salts of Co(II) or Sb(III); oxides of Sb(II), Sb(III) or Ge(IV); glycol-solubilized oxides of Sb(II), Ge(IV) or Sb(III); ortho titanate esters (preferably Ti(OR)$_4$ where R is an alkyl group having 2 to 12 carbon atoms, such as tetrabutyltitanate or tetraisopropyltitanate); solvent-based chelated organic titanates (e.g., TYZOR AA or TE catalysts (E. I. du Pont de Nemours & Co., Wilmington, Del.)); aqueous based chelated organic titanates (e.g., TYZOR LA catalyst (E. I. du Pont de Nemours & Co., Wilmington, Del.) or catalysts such as those described by Putzig, in U.S. Pat. No. 6,166,170, which is incorporated herein by reference); ortho zirconate esters (preferably Zr(OR)$_4$ is an alkyl group having 2 to 12 carbon atoms, such as tetra-n-propyl zirconate or tetra-n-butyl zirconate (E. I. du Pont de Nemours & Co.)); solvent-based chelated organic zirconates; and aqueous-based chelated organic zirconates; and combinations thereof. Oxides of Ti are preferred. Oxides of Ge such as GeO$_2$ are less preferred since they tend to result in a slow increase in IV during the polycondensation stage. Useful catalysts include those described in co-pending U.S. patent application Ser. No. 10/131,910, filed Apr. 25, 2002, which is incorporated herein by reference. Most preferred are the solvent-based chelated organic titanates and aqueous based chelated organic titanates.

The preferred amount of polycondensation catalyst is generally from about 10 to 300 ppm, or more specifically the molar ratio of catalyst to terephthalic acid is about 1:1,000 to about 1:7,300, preferably at least about 1:2,200 and preferably up to about 1:4,400.

A catalyst can also be used to enhance esterification or transesterification, and polycondensation catalysts are particularly useful in transesterification. The polycondensation catalysts described above also can be used to catalyze transesterification and can be present during direct esterification. Catalysts known in the art as useful in catalyzing esterification reactions, such as tin and zinc catalysts, can also be used. Catalysts can be added to the mixture and/or at any appropriate stage of the process.

The molar ratio of diols (1,3-propanediol and isosorbide) to terephthalic acid or its alkyl ester is from about 1.1:1 to about 1.6:1, preferably at least about 1.2:1 and preferably up to about 1.4:1, and the molar ratio of 1,3-propanediol to isosorbide is from about 2:1 to about 10:1, preferably at least about 4:1 and preferably up to about 8:1. When the other diols, anhydrosugar alcohols, diacids or diesters are used, they should replace an equivalent number of moles of diol (1,3-propanediol and isosorbide) or terephthalic acid or its alkyl ester to yield the same molar ratios.

3GIT tends to have a yellowish tint. This can be corrected using coloring agents, preferably dyes and/or pigments. Color is commonly expressed in terms of Hunter numbers which correspond to the lightness or darkness ("L*") of a sample, the color value ("a*") on a red-green scale, and the color value ("b*") on a yellow-blue scale, and which are measured as described below. It is usually desired to produce polymers with "L*" at least 70, preferably at least about 80 and most preferably at least about 90, and up to 100. Similarly, for low color polymers, "a*" and "b*" are preferably less than about 2.0 to about −2.0, and more preferably less than about 1.5, and more preferably to about −1.5. It has been found that these objectives can be met for 3GIT with the use of color-correcting additives and by controlling critical process parameters at each stage of the process, especially temperature and pressure. The dyes and pigments range from blue through red. Any suitable coloring agent can be used alone or in combination. The dyes and pigments are preferably chosen from the group consisting of cobalt acetate, HS-325 SANDOPLAST Red BB, HS-510 SANDOPLAST Blue 2B, POLYSYNTHREN Blue R, and CLARIANT RSB violet.

For low color 3GIT, it is also important to eliminate, or at least minimize, the color-forming impurities present in the monomer starting materials. Preferably, the UV absorbance of 1,3-propanediol and isosorbide are less than 0.20 at 220 nm, more preferably less than 0.10.

The mixture can comprise additives selected from the group consisting of infrared absorbing agents, dyes, pigments, and UV stabilizers; however, these additives can be added at any time including when the polymer is produced into shaped articles or other products. One preferred alternative is to add the infrared absorbing agents, dyes, pigments, and/or UV stabilizers to the process after removal of at least 80% of the water derived from the condensation of terephthalic acid with 1,3-propanediol and isosorbide. The infrared absorbing agent is preferably graphite or carbon black.

With this invention, 3GIT having a $T_g$ of greater than 50° C., more preferably at least about 55° C., and most preferably at least about 60° C., and preferably up to about 85° C. or higher, can be prepared.

DPG is a by-product of the reaction and should be minimized to improve Tg and other properties. Low DPG is achieved when using terephthalic acid by the addition of a suitable base and by minimizing the ratio of 1,3-propanediol to diacid in the initial esterification reaction. When the polymerization uses dimethyl terephthalate, DPG formation is not a concern. Preferably the base is added with the monomers to the reactor. Suitable bases include alkali, alkaline earth or ammonium bases. Preferred are sodium acetate, sodium hydroxide and tetramethylammonium hydroxide (TMAH). Most preferred is TMAH. Preferably the molar ratio of the base to the terephthalic acid is about 1:900 to about 1:14,000, more preferably at least about 1:1,800 and preferably up to about 1:6,000.

The polymerization process of this invention comprises (1) esterification or transesterification and (2) a vacuum polycondensation. The process can be carried out on a batch, continuous or semi-continuous basis.

The mixture of isosorbide, 1,3-propanediol, terephthalic acid or its alkyl ester, optional catalyst(s), and other optional ingredients and additives, is reacted (preferably over a period of about 1 to about 8 hours) in an inert atmosphere at a temperature in the range of about 180 to about 245° C., preferably at a pressure of ambient pressure to about 60 psig (about 100 to about 515 kPa), with concurrent removal of a distillate comprising at least 80% of the water or alkanol volatile reaction products, wherein the distillate contains less than about 5% 1,3-propanediol and less than 1 weight % isosorbide. The reaction is continued in the presence of a polycondensation catalyst at a pressure of about 0.25 to about 2 mm Hg and about 245–about 260° C. to form 3GIT.

Intermediate steps can be carried out especially as needed to achieve at least 80% conversion of terephthalic acid or its alkyl ester. For instance, in a batch reaction after esterification or transesterification and prior to polycondensation, the process further comprises reducing the reactor pressure at a rate of about 0.5 to about 5 psi/min to between atmospheric pressure and about 80 mm Hg to drive the conversion.

The process is preferably carried out in a reactor equipped with a distillation column and a stirrer or other means for agitation. The distillation column separates the product of reaction (water in this case of direct esterification or alkanol, e.g., methanol, in the case of transesterification) from 1,3-propanediol and isosorbide.

The process is preferably carried out using terephthalic acid (TPA) or dimethyl terephthalate (DMT).

One preferred embodiment is a batch direct esterification process carried out using terephthalic acid. In the direct esterification process, bis(3-hydroxypropylterephthalate) and other low molecular weight oligomers are produced, as well as water and other minor by-products. After loading the reactants (terephthalic acid, 1,3-propanediol, and isosorbide) and other optional catalysts and additives into the reactor, the reactor is purged to remove traces of oxygen. Inert gases such as nitrogen can be used for this purpose. Esterification starts by heating the reactants at a pressure between ambient and about 60 psig (about 100 to about 515 kPa) and removing the water and other volatile by-products via distillation. The temperature is initially increased to about 220° C., and then more slowly to a final temperature of about 225 to about 245° C.

The pressure chosen depends on the efficiency of the distillation column and on the ratio of 1,3-propanediol to isosorbide. It is generally not necessary to operate above ambient pressure (about 100 kPa) since 1,3-propanediol is a high enough boiler such that acceptable esterification rates are achieved at or below its normal boiling point temperature. The 1,3-propanediol will be readily separated from the reaction product, water, in the column. Increasing the pressure makes it more difficult to remove volatile color-forming impurities by distillation, so it is generally preferred to operate at the minimum pressure necessary to maintain acceptable 1,3-propanediol losses in the distillate.

It should also be noted that the boiling point of the mixture is a function of the composition of the mixture, and more specifically of the ratio of isosorbide to 1,3-propanediol. At high ratios, the boiling point increases, and the higher temperature of the reaction mixture results in an increased rate of esterification and associated water loss. When the ratio of isosorbide to 1,3-propanediol is low, the boiling point of the reaction mixture is lower, leading to a lower temperature of the reaction mixture. The overall effect is that the esterification reaction proceeds more slowly and the amount of 1,3-propanediol in the distillate increases.

At least about 80%, preferably at least about 90%, of the water of reaction is removed in the direct esterification step, as the temperature of the reaction mixture is increased from about 220° C. to a temperature of about 225 to about 245° C. Limiting the maximum reaction mixture temperature to 245° C. minimizes the formation of color-forming by-products. It is preferred that this step also be conducted under temperature and pressure conditions that selectively remove water and return 1,3-propanediol to the reactor. Preferably, the distillate contains less than 5 weight % 1,3-propanediol and less than 1 weight % isosorbide. This can be achieved by adjusting the temperature of the reaction mixture so that the temperature of the vapor at the top of the column (overhead vapor) does not exceed the boiling point of water at the reactor pressure.

When the batch temperature reaches the desired temperature within the range of about 220° C. to about 245° C., and the overhead vapor temperature drops about 5 to about 20° C., preferably about 10° C., below the boiling point temperature of water, the reactor pressure is reduced if necessary to atmospheric pressure at a rate of about 0.5 to about 5 psi/min (about 0.06 to about 0.6 kPa/s), preferably about 1 to about 2 psi/min (about 0.7 to about 0.2 kPa/s). As the reactor pressure drops, additional water will distill from the reactor. The temperature of the overhead vapor determines the optimal rate of pressure reduction. If the overhead vapor temperature exceeds that of the boiling point of water at the reactor pressure, the rate of pressure reduction is decreased. Conversely, if the temperature of the overhead vapor is below the temperature of the boiling point of water at the reactor pressure, the rate of pressure reduction is increased. If the total amount of water removed when the reactor is at atmospheric pressure is less than the desired amount, the pressure can be lowered to about 80 mm Hg (about 10.6 kPa) to further drive the esterification reaction. Generally, it is preferable to remove a total of at least 90% of the water of reaction over a period of about 2 to about 8 hours, before going on to the next step in the process.

The next stage of the polymerization process is polycondensation, in which oligomers are condensed to form polymer, with removal of 1,3-propanediol, isosorbide, and water. If a polycondensation catalyst was not added with the monomers, it is added at this point, together with any other desired additives which are optionally added at this stage, such as infrared absorbing agents, dyes, pigments, UV stabilizers and other thermally stable additives. The reactor pressure is then reduced about 0.25 to about 2 mm Hg (about 0.03 to about 0.27 kPa), preferably to about 0.25 to about 1 mm Hg (about 0.03 to about 0.13 kPa), over a period of less than 2 hours, preferably less than 1 hour. The temperature of the reaction mixture is raised to about 245 to about 260° C. while the pressure is lowered. The reaction mixture is held under vacuum at this temperature under agitation until the desired intrinsic viscosity is reached, typically for about 1 to about 6 hours. As intrinsic viscosity increases, the melt viscosity also increases, which in turn causes an increase in torque needed to maintain stirring. Minimizing time at high temperatures also helps to minimize color generation in the 3GIT. Typically, once the IV has reached a value of at least about 0.5, more preferably at least about 0.6 dL/g, polycondensation is completed.

Another preferred embodiment is a batch transesterification process carried out using an alkyl ester of terephthalic acid, preferably dimethyl terephthalate. For simplicity, this process will be described with respect to use of dimethyl terephthalate.

In the transesterification step, bis(3-hydroxypropylterephthalate) and other low molecular weight oligomers are produced, as well as methanol and other minor by-products. After loading the reactants (dimethyl terephthalate, 1,3-propanediol, and isosorbide) and other optional catalysts and additives into the reactor, the reactor is purged to remove traces of oxygen. Inert gases such as nitrogen can be used for this purpose. Transesterification starts by heating the reactants at a pressure between ambient pressure and about 60 psig (about 100 and about 515 kPa) and removing the methanol and other volatile by-products via distillation. The temperature is initially increased to about 180° C., and then more slowly to a final temperature of between about 225 to about 245° C.

The pressure chosen depends on the efficiency of the distillation column and on the ratio of 1,3-propanediol to isosorbide. It is generally not necessary to operate above ambient pressure (about 100 kPa) since the boiling point of 1,3-propanediol is above the 180° C. temperature where reaction begins.

At least 80%, preferably at least 90%, of the methanol of reaction is removed in the transesterification step, as the temperature of the reaction mixture is increased from 180° C. to a temperature of about 225 to about 245° C. Limiting the maximum reaction mixture temperature to about 245° C. minimizes color formation. It is preferred that this step also be conducted under temperature and pressure conditions that selectively remove methanol and return 1,3-propanediol to the reactor. Preferably, the distillate contains less than 5 weight % 1,3-propanediol and less than 1 weight % isosorbide. This can be achieved by adjusting the temperature of the reaction mixture so that the temperature of the overhead vapor does not exceed the boiling point of methanol at the reactor pressure.

When the batch temperature reaches the desired temperature within the range of about 220° C. to about 245° C., and the overhead vapor temperature drops about 5 to about 20° C., preferably 10° C., below the boiling point temperature of methanol, the reactor pressure is reduced if necessary to atmospheric pressure at a rate of about 0.5 to about 5 psi/min (about 0.06 to about 0.6 kPa/s), preferably at least about 1 and preferably up to about 2 psi/min (preferably at least about 0.1 and preferably up to about 0.23 kPa/s). As the reactor pressure drops, additional methanol will distill from the reactor. The temperature of the overhead vapor determines the optimal rate of pressure reduction. If the overhead vapor temperature exceeds that of the boiling point of methanol at the reactor pressure, the rate of pressure reduction is decreased. Conversely, if the temperature of the overhead vapor is below the temperature of the boiling point of methanol at the reactor pressure, the rate of pressure reduction is increased. If the total amount of methanol removed when the reactor is at atmospheric pressure is less than the desired amount, the pressure can be lowered to about 150 mm Hg (about 20 kPa) to further drive the reaction. Generally, it is preferable to remove a total of at least 90% of the methanol of reaction over a period of about 0.5 to about 6 hours before going on to the next step in the process.

The next step of the polymerization process is polycondensation, and is effected as described above for the terephthalic acid process except that residual methanol is removed. Temperatures, pressures, times, and optional additives are as for the terephthalic acid process. Typically, and as for the free acid process, once the IV has reached a value of at least about 0.5, preferably at least about 0.6 dL/g, polycondensation is completed.

Solid state polymerization can be used to raise the IV of the polymer made during polycondensation as described in U.S. Pat. No. 6,063,464, which is incorporated herein by reference. The polymer from either the free acid or ester process is removed at the end of polycondensation from the reactor and isolated in any of several conventional processes as strands, pellets or flake. The IV is preferably raised to about 0.8 to about 1.1 dL/g for many end-uses.

If not sufficiently crystalline, the isolated 3GIT can be crystallized by heating it to a temperature in the range of about 80° C. to about 120° C. or treating it with a crystallization-inducing solvent. The crystallized 3GIT is heated under vacuum or in a stream of inert gas at an elevated temperature of about 190° C. (typically 170° C. to 195° C.) but below the melting temperature of the crystallized 3GIT to yield a solid state polymerized 3GIT.

Shaped articles may be spun conventionally from the 3GIT. The defined process conditions give a 3GIT product that has low color and low DPG content resin for use in beverage bottles, film or sheet, fibers, and optical materials (e.g., compact disc or digital versatile disc). The 3GIT of this invention can also be used in making polymer blends and alloys.

The invention is demonstrated in the following examples, which are not intended to be limiting. Therein, all percentages, parts, etc., are by weight unless otherwise indicated.

EXAMPLES

The following analytical techniques were used.

Glass Transition Temperature (Tg)

Differential Scanning Calorimetry (DSC) was used to determine Tg values. A 10 mg sample of polymer, ground to pass a 20-mesh (7.9 cm$^{-1}$) screen, was analyzed with a TA Instruments 2920 DSC with a refrigerated cooling accessory for controlled cooling from room temperature to 280° C. using a heating rate of 10° C./min. The sample was then held at 280° C. for two minutes, quenched in liquid nitrogen, and then reheated from room temperature to 280° C. The associated software calculated a Tg, Tc, and Tm. Procedures for measurement of Tg and melting point were used as described in the TA Instruments manual for the 2920 DSC.

Polymer Composition

Mole percent isosorbide and di-1,3-propylene glycol (DPG) content were determined by analysis of the proton NMR spectrum of 3GIT. About 20 mg of 3GIT was dissolved in 1 mL trifluoroacetic acid-d (CF$_3$COOD, 99.5 atom %, see Materials, below). The sample was analyzed at room temperature using a Varian (Palo Alto, Calif.) 500 MHz spectrometer.

Color & Brightness

The color and brightness of the 3GIT samples were determined using a Varian (Palo Alto Calif.) Cary 5 UV/Vis/NIR spectrophotometer with a diffuse reflectance accessory. The reflectance data was processed using the color analysis application within Grams/32 software with an observer angle of 2 degrees and a CIE A light source. Hunter L*, a*, and b* were calculated. The L* coordinate indicated brightness, where 0 was black and 100 was white. The a* value could be positive or negative, where positive values were indicative of red color and negative indicated green. The b* value was similar, where positive values indicated yellow and negative values indicated blue.

Intrinsic Viscosity (IV)

Intrinsic viscosities were measured using a Viscotek Forced Flow Viscometer model Y-900. Polymers were dissolved in 50/50 w/w trifluoroacetic acid/methylene chloride at a 0.4% (wt/vol) concentration and were tested at 19° C. The intrinsic viscosities determined by this method are equivalent to Goodyear intrinsic viscosities.

Materials

Isosorbide was obtained from Roquette Freres (Lestrem, France).

1,3-Propanediol was obtained from E. I. du Pont de Nemours & Co., Wilmington, Del.

TA-33-LP Terephthalic acid was obtained from Amoco (Naperville, Ill.).

Trifluoroacetic acid-d (CF$_3$COOD) 99.5 atom % was obtained from Aldrich (Milwaukee, Wis.).

HS-325 SANDOPLAST® Red BB, HS-510 SANDOPLAST® Blue 2B, POLYSYNTHREN® Blue R, and CLARIANT® RSB violet were obtained from Clariant Corporation (Coventry, R.I.).

Dimethyl terephthalate was obtained from Kosa (Wilmington N.C.).

TYZOR LA (an aqueous dihydroxybisammoniumlactato titanium) was obtained from E. I. du Pont de Nemours & Co., Wilmington, Del.

Catalyst A was a catalyst solution prepared by mixing 537 g zinc acetate with 1200 g water to give a solution, adding the solution with manual stirring at room temperature (about 25° C.) to 244 g TYZOR LA (above), and then adding 43 g lactic acid to the solution.

Catalyst B was a catalyst solution prepared by mixing 150 g sodium hypophosphite with 150 g water to give a solution, adding the solution with manual stirring at room temperature (about 25° C.) to 1,000 g TYZOR LA (above).

Example 1

This example demonstrates preparing 3GIT according to the process of the invention using DMT.

To a 2-L stirred stainless steel vessel was added 873.90 g dimethyl terephthalate, 367.08 g 1,3-propanediol, 149.94 g isosorbide, 0.75 mL Catalyst A, and 1.8 mL tetramethylammonium hydroxide aqueous solution (25 weight %). The batch temperature was increased to a maximum of 240° C. while methanol was removed through a column. When 288 g of condensate was removed, the reactor contents were taken down to 2.6 mm Hg (0.35 kPa) for polycondensation at a temperature of 250° C. The IV was measured as 0.50 dL/g and the Tg was 63.5° C. Hunter color values were: L*=78.5, a*=0.02, and b*=7.7. The isosorbide content was 5.07 mole % and the polymer contained 0.07 mole % DPG.

Comparative Example A

This comparative example shows preparation of a 3GT polymer (i.e., without isosorbide) from DMT.

To a 2-liter stirred glass vessel was added 388.40 g dimethyl terephthalate, 197.86 g 1,3-propanediol, and 0.33 mL Catalyst A. The vessel was submerged in a heated oil bath. The batch temperature was increased to a maximum of 240° C. while methanol was removed through a column. If the overhead vapor temperature exceeded 67° C., the condensate valve closed to prevent the loss of 1,3-propanediol overhead. When 161 mL of a possible 162 mL of methanol had been removed within 5 hours, the reactor contents were, taken down to <1 mm Hg (<0.13 kPa) for polycondensation at 260° C. The IV was measured as 0.64 dL/g and the Tg was 47.9° C. Hunter color values were: L*=86.1, a*=0.97, and b*=2.54. The polymer contained no isosorbide and had a DPG content of 0.19, mole %.

Example 2

Comparative Example A was repeated using isosorbide. To a 2-L stirred glass vessel was added 388.40 g dimethyl terephthalate, 163.15 g 1,3-propanediol, 66.64 g isosorbide, and 0.33 mL Catalyst A. The reaction steps were as described in Comparative Example A. The time to reach an IV of 0.61 dL/g was 2 hours. The Tg was 57.9° C. Hunter color values were: L*=71.2, a*=3.3, and b*=1.02. The polymer contained 4.1 mole % isosorbide and had a DPG content of 0.8 mole %.

Example 3

This example shows use of TPA instead of DMT.

To a 2-L stirred glass vessel was added 332.20 g terephthalic acid, 163.15 g 1,3-propanediol, 66.64 g isosorbide, 0.33 mL Catalyst A, 0.8 mL tetramethylammonium hydroxide aqueous solution (25 weight %), 0.0028 g SANDOPLAST Blue 2B, and 0.0014 g SANDOPLAST Red. The vessel was submerged in a heated oil bath. The batch temperature was increased to a maximum of 240° C. while water was removed overhead through a column. If the overhead vapor temperature exceeded 102° C., the condensate valve closed to prevent the loss of 1,3-propanediol overhead. After 7.5 hours when 73 mL of condensate was removed, the reactor contents were taken down to <1 mm Hg (<0.13 kPa) for polycondensation at 255° C. The time to reach an IV of 0.62 dL/g was 4.2 hours. The Tg was 57.8° C. Hunter color values were: L*=75.1, a*=−1.13, and b*=1.34. The polymer contained 4.68 mole % isosorbide and had a DPG content of 0.67 mole %.

Example 4

This example demonstrates the invention using color masking additives.

To a 2-Liter stirred glass vessel was added 332.20 g terephthalic acid, 163.15 g 1,3-propanediol, 66.64 g isosorbide, 0.33 mL Catalyst A, 0.8 mL tetramethylammonium hydroxide aqueous solution (25 weight %), 0.0028 g SANDOPLAST Blue 2B, and 0.0014 g SANDOPLAST Red. The transesterification and polycondensation steps were the same as described for Example 3. The time to reach an TV of 0.62 dL/g was 4.2 hours. The Tg was 57.8° C. Hunter color values were: L*=75.1, a*=−1.13, and b*=1.34. The polymer contained 4.68 mole % isosorbide and had a DPG content of 0.67 mole %.

Example 5

This example demonstrates the invention using TPA.

To a 2-L stirred glass reaction vessel was added 332.20 g terephthalic acid, 163.15 g 1,3-propanediol, 66.64 g isosorbide, 0.33 mL Catalyst A, and 0.8 mL tetramethylammonium hydroxide aqueous solution (25 weight %). The vessel was submerged in a heated oil bath. The batch temperature was increased to a maximum of 240° C. while water was taken overhead through a column. If the overhead vapor temperature exceeded 102° C., the condensate valve closed to prevent the loss of 1,3-propanediol overhead. When 71.5 mL of condensate was removed, the reactor contents were taken down to <1 mm Hg (0.13 kPa) for polycondensation at 260° C. The time to reach an IV of 0.57 dL/g was 2.5 hours. The Tg was 57.8° C. Hunter color values were: L*=83.1, a*=2.66, and b*=4.71. The polymer contained 4.7 mole % isosorbide and had a DPG content of 0.60 mole %.

Example 6

This example demonstrates preparing the polymer of the invention in the form of pellets and solid state polymerizing the pellets.

To a 2-L stirred stainless steel vessel was added 747.45 g terephthalic acid, 367.08 g 1,3-propanediol, 149.94 g isosorbide, 1.08 mL Catalyst B, 0.27 mL tetramethylammonium hydroxide aqueous solution (25 weight %), 0.0079 g SANDOPLAST Blue 2B, and 0.0019 g SANDOPLAST Red. The batch temperature was increased to a maximum of 240° C. while methanol was removed through a column. When 69 g of condensate was removed, the reactor contents were taken down to 2.0 mm Hg (0.27 kPa) for polycondensation at 250° C. The IV was measured as 0.54 and the Tg was 60.4° C. Hunter color values were: L*=69.2, a*=−0.89, and b*=1.64. The isosorbide content was 5.56 mole % and the polymer contained 0.3 mole % DPG.

The polymer was pelletized by extruding under nitrogen pressure through a die to form a strand which was pulled through a cold water trough into a cutter to make ⅛ inch (3.2 mm) pellets. The crystallized pellets were subjected to solid state polymerization for 5 days at 190° C. in a vacuum oven at a vacuum of about 300 mm Hg (39 kPa) under a slow nitrogen stream. The resultant IV was 0.92 dL/g after 2 days, and the final IV was 1.071 dL/g. The resultant polymer was suitable for use in making shaped articles, such as those described above.

While the invention has been described with respect to specific embodiments, it should be understood that they are not intended to be limiting and that many variations and modifications are possible without departing from the scope of the invention.

We claim:

1. A melt polymerization process for the preparation of poly(1,3-propylene-co-isosorbide)terephthalate (3GIT) comprising:
   (a) providing a mixture comprising terephthalaic acid or its alkyl ester, 1,3-propanediol and isosorbide in a molar ratio of diols to terephthalic acid or its alkyl ester of from about 1.1:1 to about 1.6:1 and a molar ratio of 1,3-propanediol to isosorbide of from about 2:1 to about 10:1;
   (b) reacting the mixture in an inert atmosphere at a temperature of about 180 to about 245° C., with concurrent removal of a distillate comprising at least 80% of the water or alkanol volatile reaction product, wherein the distillate contains less than about 5 weight % 1,3-propanediol and less than 1 weight % isosorbide; and
   (c) continuing the reaction in the presence of a polycondensation catalyst at a pressure of about 0.25 to about 2 mm Hg and about 245 to about 260° C. to form a 3GIT containing about 4 to about 20 mole % isosorbide units, based on the 3GT.

2. The process of claim 1 wherein the terephthalic acid or its alkyl ester is terephthalic acid and the distillate comprises water.

3. The process of claim 1 wherein the terephthalaic acid or its alkyl ester is dimethyl terephthalate and the distillate comprises methanol.

4. The process of claim 1 wherein the mixture further comprises an alkali, alkaline earth or ammonium base in a molar ratio of the base to the terephthalic acid or its alkyl ester of about 1:900 to about 1:14,000.

5. The process of claim 1 wherein the mixture further comprises a polycondensation catalyst.

6. The process of claim 1 wherein the polycondensation catalyst is selected from the group consisting of Sb(III) salts; Ti(IV) salts; acetate salts of Co(II), Zn(II) or Sb(II); alkanoate salts of Co(II) or Sb(III); oxides of Sb(II), Sb(III) or Ge(IV); glycol-solubilized oxides of Ge(IV), Sb(II), or Sb(III); ortho titanate esters; solvent-based chelated organic titanates; aqueous based chelated organic titanates; ortho zirconate esters; solvent-based chelated organic zirconates; and aqueous-based chelated organic zirconates; and combinations thereof.

7. The process of claim 6 wherein the molar ratio of catalyst to terephthalic acid or its alkyl ester is about 1:1,000 to about 1:7,300.

8. The process of claim 7 wherein the polycondensation catalyst is selected from the group consisting of solvent-based chelated organic titanates and aqueous based chelated organic titanates.

9. The process of claim 1 wherein the Hunter b* color of the 3GIT is lowered to about 2.0 to about −2.0 using coloring agents.

10. The process of claim 1, further comprising solid state polymerizing the 3GIT.

11. The process of claim 2 which is a batch reaction in a reactor equipped with a distillation column wherein:

(i) the concurrent removal of the at least 80% of the water of reaction comprises separation of 1,3-propanediol and isosorbide from water by fractional distillation in the distillation column;

(ii) after the step (b) and prior to the step (c), the process further comprises:

(A) reducing the reactor pressure at a rate of about 0.5 to about 5 psi/min to between atmospheric pressure and about 80 mm Hg, and (B) subsequently reducing the pressure to the pressure of about 0.25 to about 2 mm Hg as the temperature is raised to about 245 to about 260° C.

12. The process of claim 3 which is a batch reaction in a reactor equipped with a distillation column wherein:

(i) the concurrent removal of the at least 80% of the water of reaction comprises separation of 1,3-propanediol and isosorbide from water by fractional distillation in the distillation column;

(ii) after the step (b) and prior to the step (c), the process further comprises:

(A) reducing the reactor pressure at a rate of about 0.5 to about 5 psi/min to between atmospheric pressure and about 80 mm Hg, and (B) subsequently reducing the pressure to the pressure of about 0.25 to about 2 mm Hg as the temperature is raised to about 245 to about 260° C.

13. The process of claim 11 wherein the mixture further comprises an alkali, alkaline earth or ammonium base, the molar ratio of the base to the terephthalic acid or its alkyl ester is about 1:900 to about 1:14,000, the molar ratio of catalyst to terephthalic acid or its alkyl ester is about 1:1,000 to about 1:7,300, the polycondensation catalyst is selected from the group consisting of solvent-based chelated organic titanates and aqueous based chelated organic titanates, the Hunter b* color of the GIT is lowered to about 2.0 to about −2.0 using coloring agents, and the process further comprises solid state polymerizing the 3GIT.

14. The process of claim 12 wherein the mixture further comprises an alkali, alkaline earth or ammonium base, the molar ratio of the base to the terephthalic acid or its alkyl ester is about 1:900 to about 1:14,000, the molar ratio of catalyst to terephthalic acid or its alkyl ester is about 1:1,000 to about 1:7,300, the polycondensation catalyst is selected from the group consisting of solvent-based chelated organic titanates and aqueous based chelated organic titanates, the Hunter b* color of the GIT is lowered to about 2.0 to about −2.0 using coloring agents, and the process further comprises solid state polymerizing the 3GIT.

15. Poly(1,3-propylene-co-isosorbide) terephthalate having a Hunter b* color of about 2.0 to about −2.0 made by the process of 1.

16. The poly(1,3-propylene-co-isosorbide) terephthalate of claim 15 wherein the L* is at least 70 and a* is about 2.0 to about −2.0.

17. Poly(1,3-propylene-co-isosorbide) terephthalate having a $T_g$ greater than 50° C. made by the process of 1.

18. Poly(1,3-propylene-co-isosorbide) terephthalate as claimed in claim 17 having a $T_g$ greater than 55° C.

19. Poly(1,3-propylene-co-isosorbide) terephthalate as claimed in claim 18 having a $T_g$ greater than 60° C.

20. The poly(1,3-propylene-co-isosorbide) terephthalate of claim 15 having a $T_g$ greater than 50° C.

21. The (original) Poly(1,3-propylene-co-isosorbide) terephthalate made according to the process of claim 1.

22. A shaped article comprising the poly(1,3-propylene-co-isosorbide) terephthalate of claim 15.

* * * * *